(12) United States Patent
Koch

(10) Patent No.: US 7,059,626 B2
(45) Date of Patent: Jun. 13, 2006

(54) STORABLE SPORT TRAILER

(76) Inventor: John Koch, 67 South St., San Luis Obispo, CA (US) 93401

( * ) Notice: Subject to any disclaimer, the term of this patent is extended or adjusted under 35 U.S.C. 154(b) by 270 days.

(21) Appl. No.: 10/636,935

(22) Filed: Aug. 7, 2003

(65) Prior Publication Data

US 2005/0029776 A1 Feb. 10, 2005

(51) Int. Cl.
*B62B 1/00* (2006.01)
(52) U.S. Cl. .......................... 280/656; 280/38
(58) Field of Classification Search .............. 280/656, 280/646, 639, 47.31, 38, 652, 653, 40, 63, 280/65, 47.131, 47.26, 769
See application file for complete search history.

(56) References Cited

U.S. PATENT DOCUMENTS

| | | | |
|---|---|---|---|
| 341,690 A | 5/1886 | Reichenbach | |
| 639,991 A | 12/1899 | Jewell | |
| 2,456,013 A * | 12/1948 | Witt | 296/181.7 |
| 2,469,506 A | 5/1949 | Kerr et al. | |
| 2,469,914 A | 5/1949 | Banaszak et al. | |
| 2,879,072 A | 3/1959 | Rear et al. | |
| 3,025,985 A | 3/1962 | Crawford | |
| 3,031,180 A | 4/1962 | Sergay | |
| 3,367,675 A | 2/1968 | Gearin | |
| 3,781,030 A | 12/1973 | Ekedal | |
| 3,885,146 A * | 5/1975 | Whitley, Jr. | 362/485 |
| 3,941,406 A | 3/1976 | Eggleston | |
| 3,966,223 A | 6/1976 | Carr | |
| 4,180,280 A * | 12/1979 | Doveri | 280/277 |
| 4,230,340 A | 10/1980 | Wasservogel | |
| 4,239,258 A | 12/1980 | Burris | |
| 4,344,643 A | 8/1982 | Ray | |
| 4,415,181 A * | 11/1983 | McCall et al. | 280/788 |
| 4,442,961 A | 4/1984 | Bolt | |
| 4,453,735 A | 6/1984 | Penverne et al. | |
| 4,480,851 A * | 11/1984 | St-Pierre | 280/656 |
| 4,746,142 A | 5/1988 | Davis | |
| 4,765,642 A * | 8/1988 | Struzina | 280/656 |
| 4,786,073 A | 11/1988 | Harper | |
| 4,995,129 A | 2/1991 | Comardo | |
| 5,137,297 A * | 8/1992 | Walker | 280/414.5 |
| 5,249,823 A | 10/1993 | McCoy et al. | |
| 5,265,897 A | 11/1993 | Stephens | |
| 5,340,134 A | 8/1994 | Dodson | |
| 5,364,081 A | 11/1994 | Hartl | |
| 5,397,148 A * | 3/1995 | Nelson | 280/416.1 |
| 5,549,231 A | 8/1996 | Fletcher et al. | |
| 5,673,928 A * | 10/1997 | Jury | 280/645 |

(Continued)

*Primary Examiner*—Christopher P. Ellis
*Assistant Examiner*—Bridget Avery
(74) *Attorney, Agent, or Firm*—John C. McMahon

(57) ABSTRACT

A utility trailer having a low profile storage configuration. The trailer includes a frame, wheels, mounting assemblies for the wheels, a removable tongue and a wiring system. Each mounting assembly includes a swing arm and a shock absorber that are joined by a hub that is easily removable and in turn is rotatably joined to a wheel. Each swing arm is pivotally joined to an underside of a side rail of the frame. Each shock absorber is pivotally attached to an inner side of the side rail and each wheel is positioned outwardly of a respective side rail opposite a respective shock absorber. The wiring system includes a harness located in the interior of the tongue. The wiring system also includes a plug mounted on the frame and a receptacle mounted on the tongue that automatically mate when the tongue is joined to the frame.

4 Claims, 4 Drawing Sheets

U.S. PATENT DOCUMENTS

| | | |
|---|---|---|
| 5,924,836 A | 7/1999 | Kelly |
| 5,941,542 A | 8/1999 | Kalman |
| 6,164,683 A | 12/2000 | Kalman |
| 6,199,909 B1 | 3/2001 | Kass et al. |
| 6,283,496 B1 * | 9/2001 | Dickmann .................. 280/652 |
| 6,585,285 B1 | 7/2003 | Koch |
| 6,951,346 B1 * | 10/2005 | Brackett et al. ......... 280/491.2 |

* cited by examiner

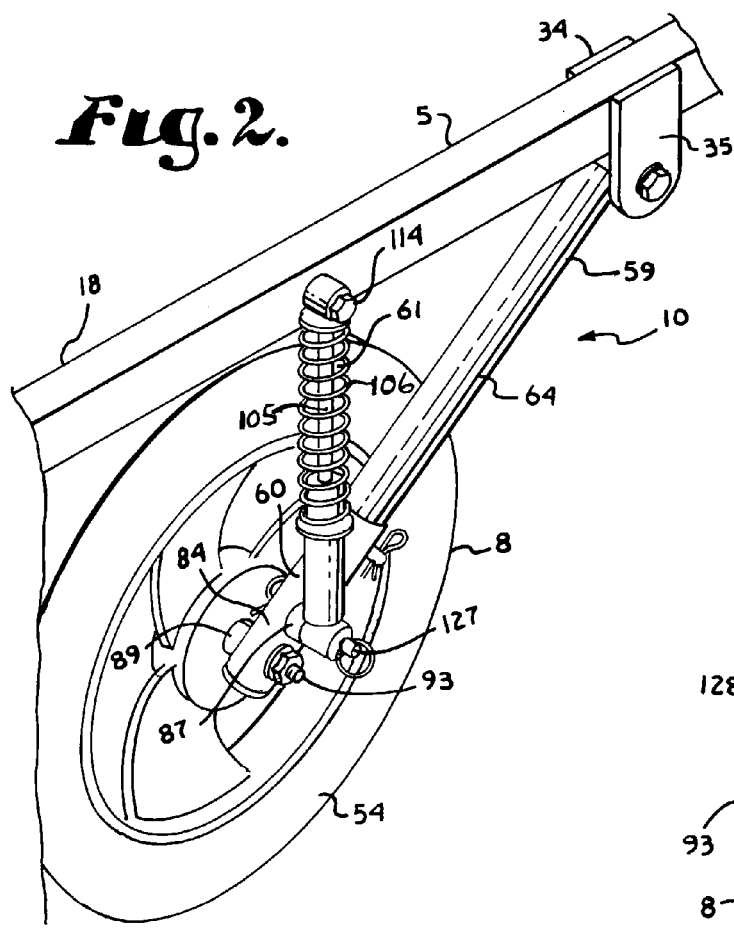
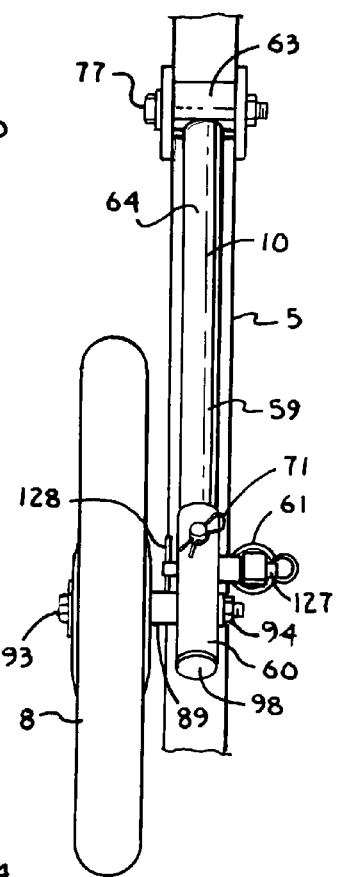
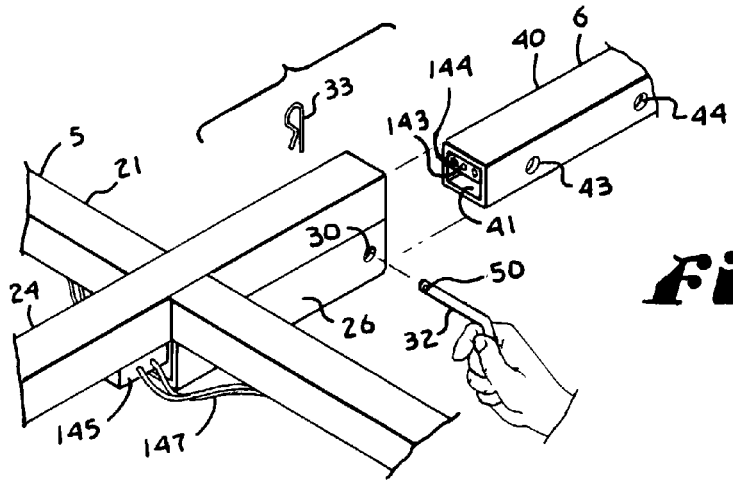

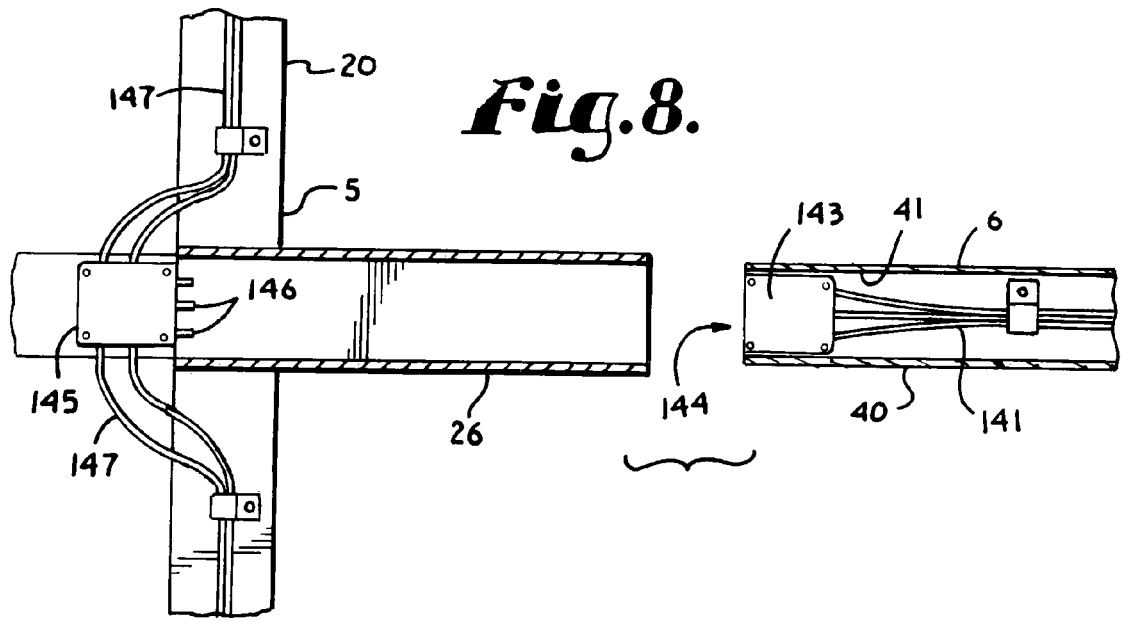
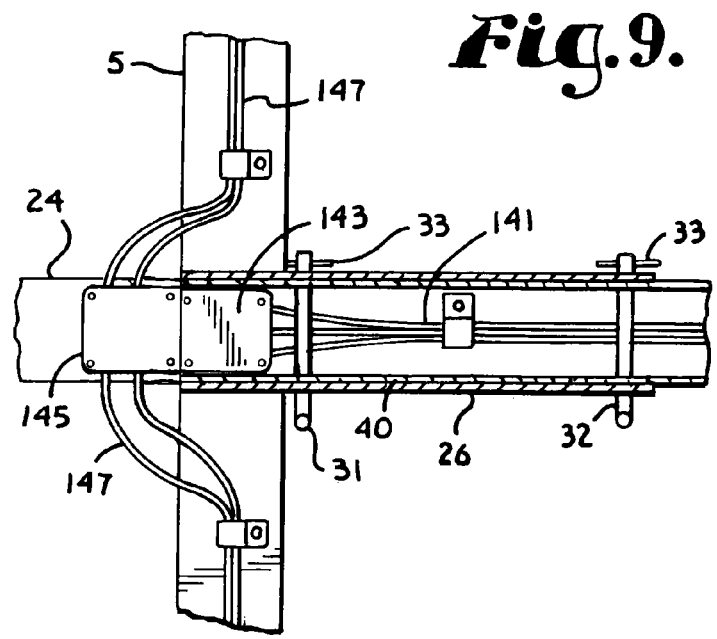

ical appearance of the home. Therefore, there is a desire to store such trailers in garages. However, the trailer, when in a use configuration, will take up an entire garage bay that may be needed for other purposes, such as garaging the family car. Consequently, there is also a need for the trailer to have a storage configuration wherein it has a low storage profile that allows it to lean against a wall of the garage and consume relatively very little space so a car can be parked in the same bay with the stored trailer.

STORABLE SPORT TRAILER

BACKGROUND OF THE INVENTION

The present invention is a utility trailer for hauling sports equipment and the like that is easily convertible to a low profile configuration for storage against a wall in a garage bay with a car or other vehicle.

Various types of outdoor sporting activities are becoming increasingly popular. Many of these activities require equipment that will not fit in many transporting vehicles or may cause damage if put in such a vehicle. Such equipment includes items such as motorized bikes, powered watercraft, bicycles, kayaks and the like. A standard rack can be obtained for transporting certain of these items on top of a transporting vehicle, but it is difficult to place the equipment on the roof of the vehicle. For example, a bicycle is very ungainly and relatively heavy that can be loaded on a vehicle's roof, but only with great difficulty, especially if only one person is available. Other equipment is just to heavy or large to place on a roof.

Consequently, utility trailers for carrying sports equipment have become very popular, especially in regions where a great amount of outdoor activity occurs.

The owner of such a trailer often wants to protect it from the elements and from theft, when not in use, or may simply want to reduce clutter around their home because of local ordinances or to otherwise increase the aesthetical appearance of the home. Therefore, there is a desire to store such trailers in garages. However, the trailer, when in a use configuration, will take up an entire garage bay that may be needed for other purposes, such as garaging the family car. Consequently, there is also a need for the trailer to have a storage configuration wherein it has a low storage profile that allows it to lean against a wall of the garage and consume relatively very little space so a car can be parked in the same bay with the stored trailer.

In order to provide such a low profile, it is preferable for the wheels to be removed and for swing arms and shock absorbers, that are associated with mounting the wheels, to be able to pivot tightly or closely against the frame when the frame is stood upward, so as to present a relatively narrow width. Further, it is desirable that the wheels disassemble easily and without requiring wrenches to remove nuts or the like so that a user can easily and quickly modify the trailer from a use configuration to a storage configuration.

Still further, in order that the trailer, when in the storage configuration, is not too tall for the bay in which it is to be stored, it is also desirable that the towing tongue be removable. Normally, a wiring system to provide lights for the trailer also extends along or is somehow run in association with the tongue. In such instances, removal or replacement of the tongue requires a substantial amount of handling of wiring. In accordance with the invention, it is preferred to have a tongue that easily joins to the body of the trailer with a minimum of work and does not require tools for removal. Further, it is desirable that the tongue incorporate the wiring in such a manner that the wiring associated with the tongue is automatically mated with the wiring on the rest of the trailer simply by joining the tongue to the body of the trailer.

SUMMARY OF THE INVENTION

A trailer having a frame, a pair of ground traversing wheels and a tongue. Each of the wheels are joined to the frame by a wheel mounting assembly including a swing arm pivotally connected to an underside of a side rail of the frame, a shock absorber and a joining hub.

The shock absorber is pivotally mounted on the side of a respective side rail. The joining hub is rotatably connected to a respective wheel so as to allow rotation of the wheel and includes a tube that slidingly receives the swing arm and that abutingly and pivotally is selectively joinable to the shock absorber. Both the shock absorber and the swing arm are easily and quickly secured by manually insertable and removable pins to the joining hub. The wheel is removed with the hub from the remainder of the trailer by removing the pins. When the hub is removed, the swing arm and the shock absorber are free to swing relative to the frame and rotate to a position that is in general alignment with or close to parallel to a respective side rail of the frame when the frame is set on end, so parts do not extend outwardly from the frame and so as to produce a relatively low storage profile.

Each swing arm is also located directly under a respective side rail, while a respective shock absorber and wheel are on opposite sides of both the swing arm and side rail. The relative position of associated swing arms, shock absorbers and wheels reduces tension on the swing arm and allows for a simple but strong construction. The relative position of the swing arm and shock absorber allow both to rotate or fold fully in line with the frame, when the frame is aligned vertically, so as to not interfere with one another.

The tongue is received in a tongue receiver and held therein by pins that are removable to allow separation of the tongue from the frame of the trailer for storage. A wiring harness is provided that is threaded through the tongue and provides electricity for lights of the trailer. A connector is provided at the rearward end of the tongue for connecting the wiring harness to the rest of the wiring on the trailer. The connector includes a female receptacle and a male plug with contacts that are fixedly positioned at the rear of the tongue and at the rear of the tongue receptacle respectively and which are automatically joined or mated when the tongue is fully slid into the tongue receptacle.

OBJECTS AND ADVANTAGES OF THE INVENTION

Therefore, the objects of the present invention are: to provide a utility trailer that is easily storable by leaning against a wall in a generally vertical alignment and, when so stored, has a relatively narrow width or profile, such that the trailer can be easily placed in a garage bay in the stored configuration with another vehicle; to provide such a trailer having wheels with wheel mounting assemblies or suspensions that each include a swing arm pivotally connected to a side rail of a frame of the trailer, a shock absorber pivotally connected to a respective side rail and a joining hub that is rotatably joined to a wheel and removably joined to the swing arm and shock absorber; to provide such a trailer wherein each swing arm is pivotally mounted beneath an associated side rail and each shock absorber is pivotally mounted to the side of an associated side rail, such that, when the swing arms and shock absorbers are disassembled from an associated hub, the swing arms and shock absorbers are free to rotate so as to be close and near parallel with a respective side rail, when the frame of the trailer is vertically aligned; to provide such a trailer wherein each swing arm is mounted on the underside of a respective side rail and an associated shock absorber is mounted to one side of the side rail, while a wheel is mounted on an opposite side of the side rail, when the trailer is in a use configuration; to provide such a trailer having a towing tongue that is removable for storage and that includes a wiring harness with a mounted receptacle that automatically mates with a fixed plug mounted on the trailer frame, when the tongue is joined the frame; to provide such a trailer wherein each hub with an associated wheel and the tongue are easily removed from or rejoined with the remainder of the trailer by removing or replacing manual pins without requiring tools; to provide such a trailer that can be easily modified to adjust for heavier or lighter loads by changing shock absorbers; and to provide such a trailer that is relatively inexpensive to produce, easy to use and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an enlarged, fragmentary and perspective view of a portion of the trailer showing a side rail of a frame, a wheel and a mounting assembly for the wheel.

FIG. 3 is an enlarged, fragmentary and bottom plan view of the frame, a wheel and an associated wheel mounting assembly of the trailer.

FIG. 4 is a fragmentary, perspective and partially exploded view of a portion of the trailer showing a tongue removed therefrom.

FIG. 8 is an enlarged and fragmentary bottom plan view of the trailer showing a tongue and electrical elements associated therewith prior to joining of the tongue with a remainder of the trailer with portions broken away to show interior detail.

FIG. 9 is an enlarged and fragmentary bottom view of the trailer similar to FIG. 8 except with the tongue joined with the remainder of the trailer.

DETAILED DESCRIPTION OF THE INVENTION

Figure 1:
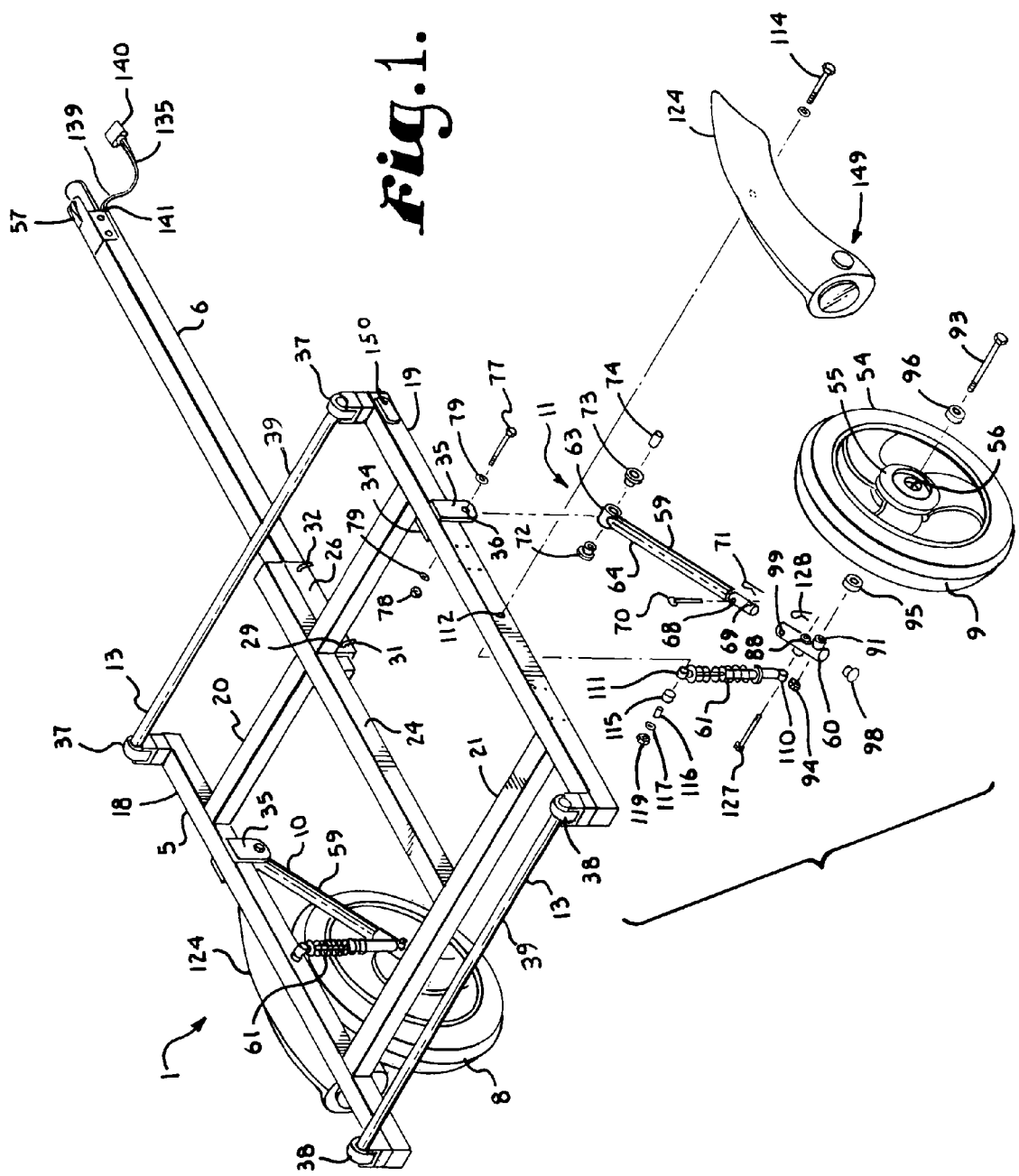
FIG. 1 is a perspective and partially exploded view of a storable trailer in accordance with the present invention.
Figure 5:
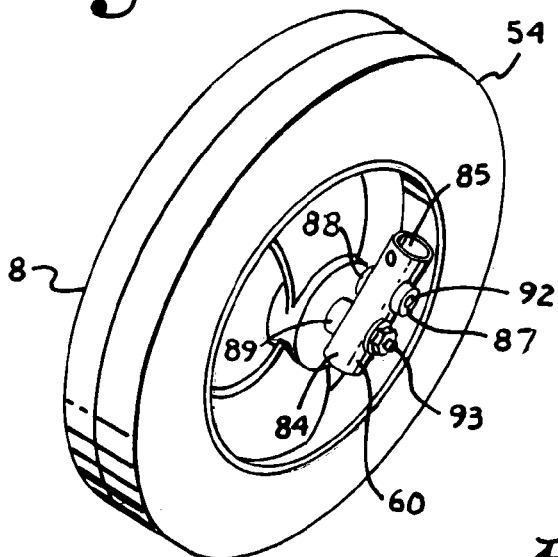
FIG. 5 is a enlarged perspective view of a wheel and a hub portion of the wheel mounting assembly of the trailer separated from a remainder of the trailer.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally illustrates a trailer in accordance with the present invention having a load supporting frame 5, a removable tongue 6, a pair of wheels 8 and 9, a pair of wheel mounting assemblies 10 and 11 and a load support system 13.

The frame 5 includes a pair of front to rear extending and laterally spaced side rails 18 and 19 that are fixably joined together by a front rail 20 and a rear rail 21 to form a generally rigid rectangularly shaped structure with the side rails 18 and 19 protruding forwardly and rearwardly relative to the front rail 20 and rear rail 21 respectively. A center front to rear extending beam 24 rigidly joins the front rail 20 and rear rail 21, while protruding slightly forward of the front rail 20. The center beam 24 is parallel to the side rails 18 and 19. Depending from the front end of the center beam 24 is a tongue receiver 26. The tongue receiver 26 is open at the front end thereof and sized and shaped to snugly but slidably receive the tongue 6. The tongue receiver 26 includes a pair of side to side pass through bores 29 and 30 which operably receive tongue locking pins 31 and 32 respectively. The pins 31 and 32 are manually insertable and removable for converting between configurations. Each locking pin includes a keeper 33 for securing the pins 31 and 32 in place.

On either side of the frame 5 near whereat the side rails 18 and 19 join with the front rail 20, a pair of ears 34 and 35 are fixably attached to opposite sides of each side rail 18 and 19 and depend downwardly therefrom so as to form a clevis arrangement. Each ear 34 and 35 includes a side to side bore 36.

The load support system includes a pair of mounts 37 and 38 located near opposite ends of each of the side rails 18 and 19. A pair of bars 39 extend between mounts 37 and 38 respectively. The bars 39 are preferably sized, shaped and spaced appropriately for receiving racks, carriers or the like for the equipment to be carried by the trailer 1.

The tongue 6 is an elongate tubular member 40 with an interior channel 41 extending the entire axial length of the tongue 6. The tubular member 40 has a rectangular shape and and is sized and shaped to slide into and snugly fit within the tongue receiver 26. Toward the rear of the tubular member 40 is a pair of spaced and side to side pass through bores 43 and 44 that are sized shaped and aligned such that, when the tubular member 40 is received in the tongue receiver 26, the bores 43 and 44 align with the bores 29 and 30 respectively so as to receive the locking pins 31 and 32. FIG. 4 illustrates locking pin 32 in position to be inserted and just prior to insertion of the tubular member 40 into the tongue receiver 26. FIG. 1 illustrates the locking pins 31 and 32 in a locked configuration. Each of the pins 31 and 32 has an aperture 50 for receiving an associated spring loaded keeper 33. The tongue 6 has a conventional ball type coupler 57 for joining with a ball (not shown) of towing vehicle (not shown).

Each of the wheels 8 and 9 have a ground traversing tire 54, a hub 55 and an axle receiving bore 56.

Each of the wheels 8 and 9 are associated with a respective wheel mounting assembly 10 and 11. Each of the wheel mounting assemblies 10 and 11 include a swing arm 59, a mounting hub 60 and a shock absorber or assembly 61. Each swing arm 59 includes an upper cylindrical shaped and radially extending bearing sleeve 63 and an elongate rod 64 fixedly attached to the sleeve 63. The rod 64 in the present embodiment is illustrated as being circular in cross section, however it is foreseen that the rod 64 may also be square in cross section or otherwise shaped to aid in resisting twisting forces presented thereto by an associated wheel 8. An end 66 of the rod 64 opposite the bearing sleeve 63 is of reduced diameter in comparison to the remainder of the rod 64 and has a pair of pass through bores 68 and 69 located therealong so as to radially penetrate the rod end 66. The bores 68 and 69 are spaced and circumferentially located 90 degrees relative to one another. A pin 70 with a spring keeper 71 is operably received through the bore 68.

Each swing arm 59 is secured to the frame 5 between a pair of the ears 34 and 35. In particular, the bearing sleeve 63 receives a pair of interior bushings 72 and 73 and a sleeve 74 while being held in place by a pivot bolt 77 secured by nut 78 with a pair of washers 79 on either side thereof. In this manner, each swing arm 59 is able to pivot or rotate about an axis passing through a respective bearing sleeve 63 relative to pair of the ears 34 and 35 and, consequently, the associated side rail 18 or 19. In particular, each swing arm 59 pivots beneath a respective side rail 18 or 19 from front to rear relative to the trailer 1.

The mounting hub 60 includes a tube 84 with an interior circular bore 85 that is sized and shaped to slideably but snugly receive the rod end 66. The tube 84 has three radial extensions 87, 88 and 89. The extensions 87 and 88 are axially aligned on opposite sides of the tube 84 and have an interior pass through bore 92. The extension 89 is positioned slightly lower on the tube 84 and extends outward therefrom toward associated wheel 8. The interior of the extension 89 operably receives a bolt 93 that also passes through wheel bearings 95 and 96 on each side of associated wheel 8 or 9. The bolt 93 is secured in a passthrough bore 91 of the extension 89 by a nut 94. An end cap 98 is received in the lower end of the tube 84. When the swing arm 59 and mounting hub 60 are assembled, the pin 70 is inserted through a radial bore 99 in the hub 60 and the bore 68 in the swing arm 59, as a safety backup to prevent inadvertent disassembly of the hub 60 from the swing arm 59.

The shock absorber 61 includes an interior dampening shock 105 and an exterior spring 106. In accordance with the present invention, the shock absorber 61 is designed to be especially useful in conjunction with a particular load for which the trailer 1 is intended. For example, the shock absorber 61 may be designed to handle loads up to 250 pounds, or alternatively for loads from 250 to 500 pounds, or other loads as necessary. This provides a smoother ride for the particular load carried by the trailer 1.

The shock absorber 61 has an upper bored mount 111 and lower bored mount 110 that are fixably attached and radially aligned with respect to the shock absorber assembly 61. The upper mount 111 is operably located on the interior of a respective side rail 18 or 19 with each side rail having side to side pass through bores 112, and is pivotally held in position at that location by a bolt 114 passing through the bores 112, so that the shock absorber 61 is swingable from front to rear relative to the trailer 1. The bolt 114 also passes through a bushing 115, a sleeve 116 and a washer 117 and is secured by a nut 119. Each bolt 114 also passes through a fender 124 so as to also hold the fender 124 in place. The lower mount 110 receives a locking and removable pin 127 that also passes through the extensions 87 and 88 of the mounting hub 60 and the swing arm bore 69 and is secured by a spring keeper 128.

An electrical system 135 provides electrical power to light the trailer 1. In particular, the electrical system 135 includes an electrical wiring harness 139 that includes a distal plug 140 that is sized, shaped and adapted to plug into an electrical system (not shown) of a vehicle towing the trailer 1. The electrical harness 139 includes an elongate length of wiring 141 that extends through the tongue channel 41. The wiring 141 ends in a quick connect receptacle 143 with female contacts 144. Closely positioned behind the tongue receiver 26 is an electrical plug 145 with male contacts 146 that is operably positioned, spaced and designed so as to mate with the receptacle 143 in a plug in type mode, when the tongue 6 is fully received within the tongue receiver 26. That is, the receptacle 143 and plug 145 properly mate automatically to form an electrical connection therebetween, as the tongue 6 is slid into the tongue receiver 26. The plug 145 is in turn operably connected with wiring 147 which extends along the rails 18, 19 and 20 to each of the fenders 124. Each of the fenders 124 include a light system 149 joined to the wiring 147 so as to be provided electrical power through the electrical system 135 described above. A front marker light 150 in each side rail 18 and 19 also receives electrical power through the electrical system 135.

In use, the trailer 1 is configured in a use configuration, as seen on the left hand side in FIG. 1. In the use configuration, the trailer 1 is fully assembled and ready to join with a towing vehicle (not shown) to transport various items (not shown) such as sporting equipment including motorcycles or the like. The items to be transported are secured in a well known manner to the load support system 13 or, alternatively, a support or special carrier that extends between the bars 39 of the system 13 may be utilized for specific equipment. Further, it is foreseen that loads may be secured directly to the frame 5.

Figure 6:
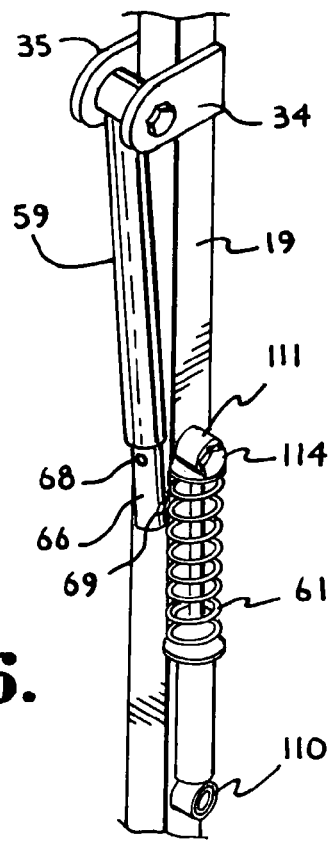
FIG. 6 is an enlarged and fragmentary view of the trailer subsequent to removal of the wheel and with the bed of the trailer standing upright or vertical.
Figure 7:
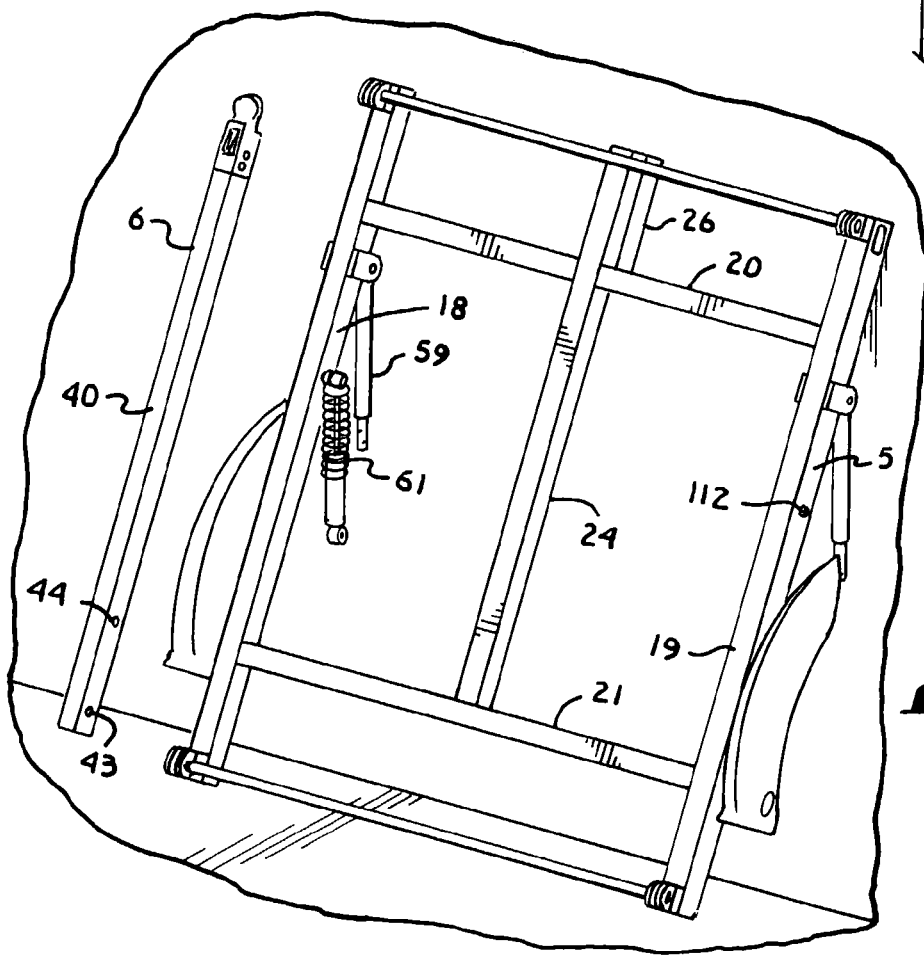
FIG. 7 is a perspective view of the trailer with the wheels and tongue removed illustrating the trailer in a stored position thereof wherein the frame and tongue lean against a wall.

When the trailer 1 is not in use, it is converted to a storage configuration, as seen in FIG. 7. In particular, the pins 70 and 127 are manually removed without need of tools from each hub 60. The wheels 8 and 9 with attached hub 60 are then removed and set aside for storage. The pins 31 and 32 are removed and the tongue 6 is then removed from the tongue receiver 26 and set aside for storage. The frame 5 may also be hung on a wall using hooks or the like. The frame 5 of the trailer 1 is then set to lean against a vertical wall such as seen in FIG. 7. As the frame 5 approaches vertical in the storage configuration, the swing arms 59 and shock absorbers 61 pivot and rest against the underside and side respectively of an associated side rail 18 or 19, as is seen in FIG. 6. Reversing this process makes the trailer 1 ready for use transporting loads.

The ease of assembly of the trailer 1 in accordance with the invention, also allows the trailer 1 to be shipped in the storage configuration, so that it requires relatively little space, and can be reassembled very quickly and easily when it arrives at its final destination.

It is to be understood that while certain forms of the present invention have been illustrated and described herein, it is not to be limited to the specific forms or arrangement of parts described and shown.

What is claimed and desired to be secured by Letters Patent is as follows:

1. A utility trailer adapted for transporting equipment in a use configuration and having a low profile storage configuration comprising:
   a) a frame adapted to support equipment and including a pair of spaced side rails;
   b) a pair of ground traversing wheels;
   c) a pair of wheel mounting assemblies; each of said mounting assemblies operably joining a respective wheel to a respective side rail; each of said mounting assemblies including:
      1) an elongate swing arm pivotally mounted at a first end thereof to a respective side rail and having a second end;

2) a shock absorber pivotally mounted at a first end thereof to a respective side rail and having a second end;
3) a hub rotatably joined to a respective wheel; said hub being removably joined to a respective swing arm second end and to a respective shock absorber second end by a manually removable first pin so as to allow each wheel with an associated hub to be selectively moved between said use configuration wherein the hub is joined to the trailer and said storage configuration wherein said hub is removed from a remainder of said trailer; said frame being raisable to an upright position when in said storage configuration wherein said swing arm second ends and said shock absorber second ends swing toward respective side rails to produce a low profile of the trailer while being stored; and including
4) a second pin for operably connecting each swing arm to a respective hub.

2. A utility trailer adapted for transporting equipment in a use configuration and having a low profile storage configuration comprising:
   a) a frame adapted to support equipment and including a pair of spaced side rails;
   b) a pair of ground traversing wheels;
   c) a pair of wheel mounting assemblies; each of said mounting assemblies operably joining a respective wheel to a respective side rail; each of said mounting assemblies including:
      1) an elongate swing arm pivotally mounted at a first end thereof to a respective side rail and having a second end;
      2) a shock absorber pivotally mounted at a first end thereof to a respective side rail and having a second end;
      3) a hub rotatably joined to a respective wheel; said hub being removably joined to a respective swing arm second end and to a respective shock absorber second end by a manually removable connector so as to allow each wheel with an associated hub to be selectively moved between said use configuration wherein the hub is joined to the trailer and said storage configuration wherein said hub is removed from a remainder of said trailer; said frame being raisable to an upright position when in said storage configuration wherein said swing arm second ends and said shock absorber second ends swing toward respective side rails to produce a low profile of the trailer while being stored;
      4) said hub includes a tube that is sized and shaped to slidingly and snugly receive a lower end of a respective swing arm; and
      5) said tube and a respective swing arm lower end each include bores that align, when said lower end is fully received in said tube, and wherein said connector is a pin sized and shaped to be removably received in said bores.

3. A utility trailer adapted for transporting equipment in a use configuration and having a low profile storage configuration comprising:
   a) a frame adapted to support equipment and including a pair of spaced side rails;
   b) a pair of ground traversing wheels;
   c) a pair of wheel mounting assemblies; each of said mounting assemblies operably joining a respective wheel to a respective side rail; each of said mounting assemblies including:
      1) an elongate swing arm pivotally mounted at a first end thereof on an underside of a respective side rail and having a lower end;
      2) a shock absorber pivotally mounted at a first end thereof to an inner side of a respective side rail and having a second end;
      3) a hub removably joining with said second ends of said swing arm and said shock absorber; a respective wheel being rotatably mounted on said hub so as to be positioned on an opposite side of a respective side rail from a respective shock absorber;
      4) said hub includes a tube sized and shaped to slidingly receive a respective swing arm lower end;
      5) said swing arm lower end and a respective tube both include bores that are aligned when said lower end is located in a respective tube; and including
      6) a first pin removably received within said bores to secure a respective hub to a respective swing arm; and
      7) said hub is secured to a respective shock absorber by a second removable pin.

4. A utility trailer adapted for transporting equipment in a use configuration and having a low profile storage configuration comprising:
   a) a frame adapted to support equipment and including a pair of spaced side rails;
   b) a pair of ground traversing wheels;
   c) a pair of wheel mounting assemblies; each of said mounting assemblies operably joining a respective wheel to a respective side rail; each of said mounting assemblies including:
      1) an elongate swing arm pivotally mounted at a first end thereof on an underside of a respective side rail and having a lower end;
      2) a shock absorber pivotally mounted at a first end thereof to an inner side of a respective side rail and having a second end;
      3) a hub removably joining with said second ends of said swing arm and said shock absorber; a respective wheel being rotatably mounted on said hub so as to be positioned on an opposite side of a respective side rail from a respective shock absorber;
      4) said hub includes a tube sized and shaped to slidingly receive a respective swing arm lower end;
      5) said swing arm lower end and a respective tube both include bores that are aligned when said lower end is located in a respective tube;
      6) a first pin removably received within said bores to operably secure a respective hub to a respective swing arm; and
      7) each hub is removably secured to a respective shock absorber by a respective second pin.

* * * * *